Figure 3:
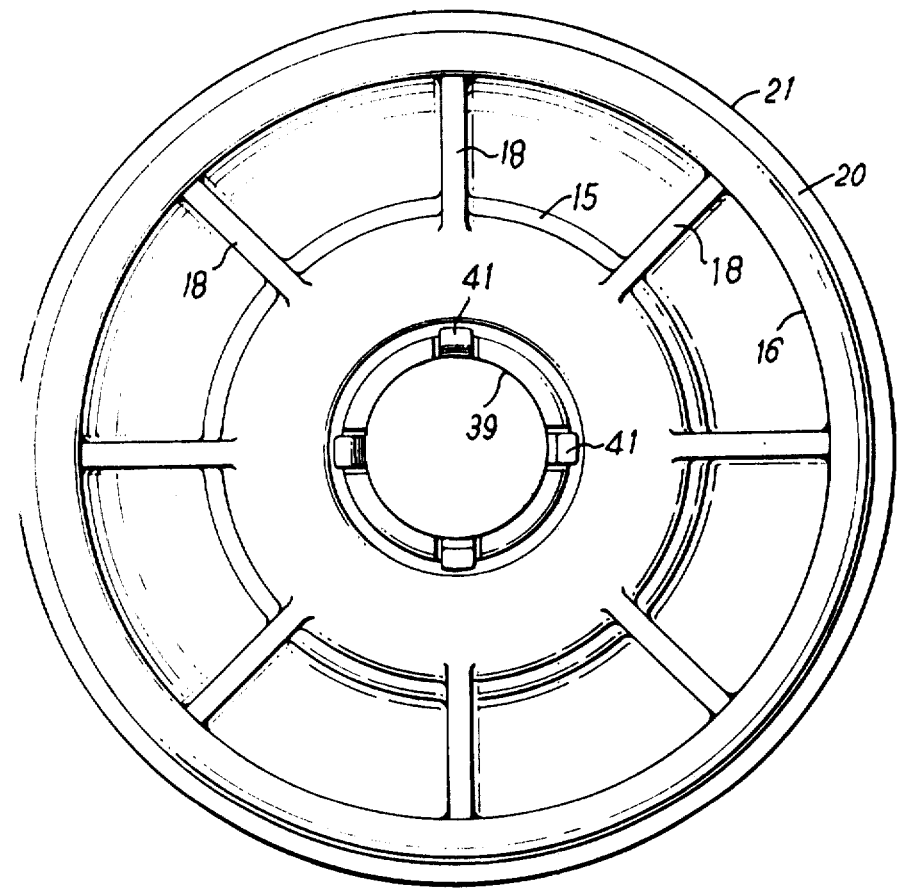

United States Patent [19]

Greener et al.

[11] 4,373,759
[45] Feb. 15, 1983

[54] BEARING ASSEMBLIES FOR CONVEYOR ROLLERS FITTED WITH END COVERS

[75] Inventors: Brian Greener, Welwyn Garden City; Simon J. Pedder, Luton; John P. Forknall, Dunstable, all of England

[73] Assignee: SKF (U.K.) Limited, Bedfordshire, England

[21] Appl. No.: 128,895

[22] Filed: Mar. 10, 1980

[30] Foreign Application Priority Data

Mar. 9, 1979 [GB] United Kingdom ............... 7908395

[51] Int. Cl.³ .................... F16C 33/80; F16C 35/06
[52] U.S. Cl. ................................................ 308/187.2
[58] Field of Search ............ 308/20, 26, 187.1, 187.2, 308/189 R, 193, 195, 184 R, DIG. 1, 190, 191, 236; 193/37; 29/110, 119

[56] References Cited

U.S. PATENT DOCUMENTS

| | | | |
|---|---|---|---|
| 1,660,512 | 2/1928 | Jaenicke | 193/37 |
| 2,757,988 | 8/1956 | Lecourse | 193/37 X |
| 2,825,439 | 3/1958 | Collis | 193/37 X |
| 2,851,140 | 9/1958 | Kindig | 193/37 |
| 3,086,826 | 4/1963 | Gunnell | 193/37 X |
| 3,610,387 | 10/1971 | Stein | 193/37 |
| 3,957,147 | 5/1976 | Specht | 193/37 |
| 4,059,180 | 11/1977 | Krivec et al. | 308/20 |
| 4,272,135 | 6/1981 | Hamblin et al. | 193/37 X |

FOREIGN PATENT DOCUMENTS

| | | | |
|---|---|---|---|
| 1009862 | 6/1951 | Fed. Rep. of Germany | 308/189 R |
| 411476 | 11/1966 | Fed. Rep. of Germany | 308/20 |
| 2740302 | 3/1978 | Fed. Rep. of Germany | 308/20 |
| 594060 | 9/1925 | France | 308/20 |
| 1147911 | 4/1969 | United Kingdom | 308/20 |
| 1193309 | 5/1970 | United Kingdom | 308/20 |
| 1478993 | 7/1977 | United Kingdom | 308/20 |

Primary Examiner—Richard R. Stearns
Attorney, Agent, or Firm—Browdy and Neimark

[57] ABSTRACT

A conveyor roller comprises a roller tube fitted with end cap assemblies incorporating bearings for rotatably mounting the roller tube on a fixed shaft. Each end cap assembly is a self-contained unit comprising a housing, a ball bearing mounted in the housing, and an end cover having an annular flange extending as a close fit through the inner bearing ring and secured therein by abutments on the flange engaging opposite sides of the inner bearing ring. The end cover has a central bore for reception of the shaft as a close sliding fit. The housing and the end cover have annular concentric tongues which are interleaved to form an annular labyrinth passageway providing a seal between the housing and the end cover. The inner end of the labyrinth passageway is closed by an annular seal compressed between the housing and the end cover.

9 Claims, 7 Drawing Figures

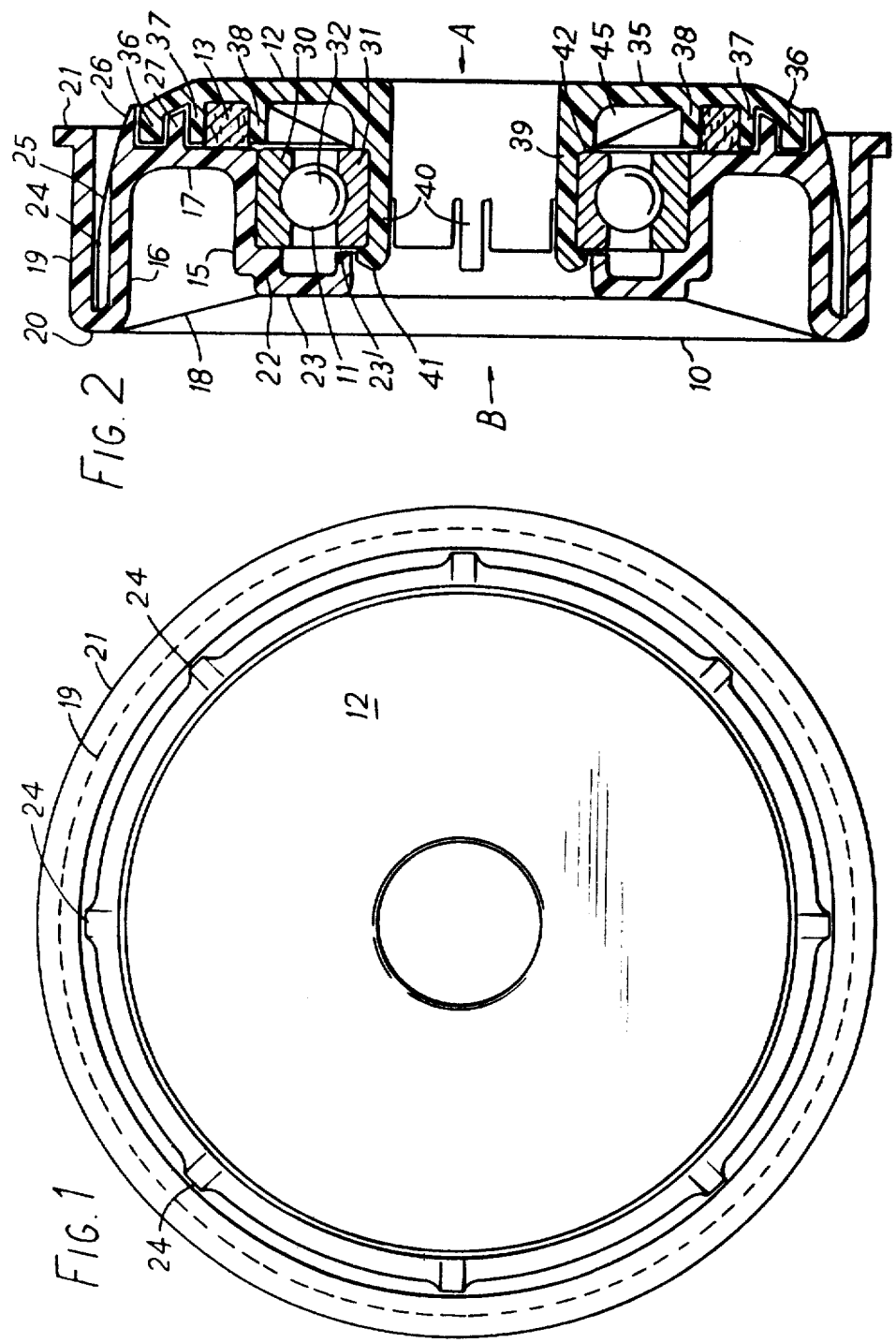

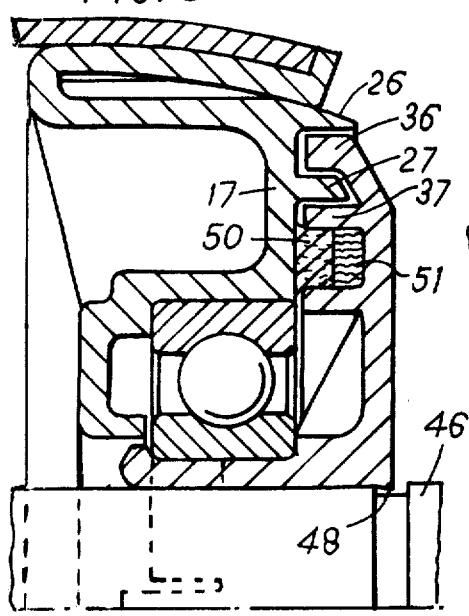
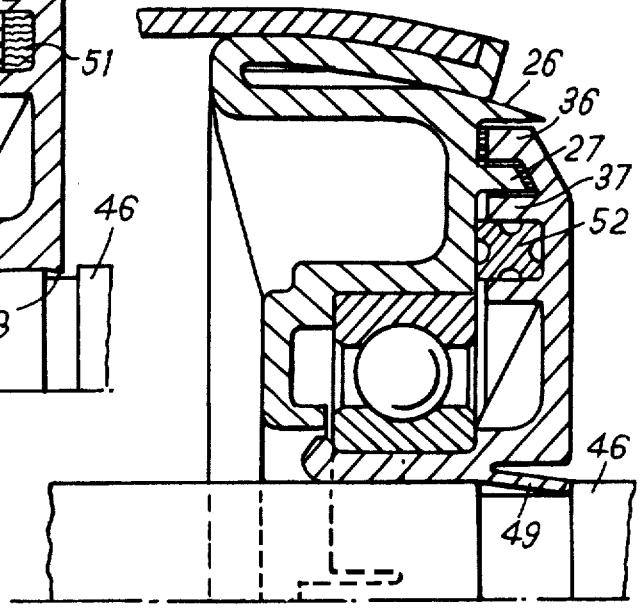
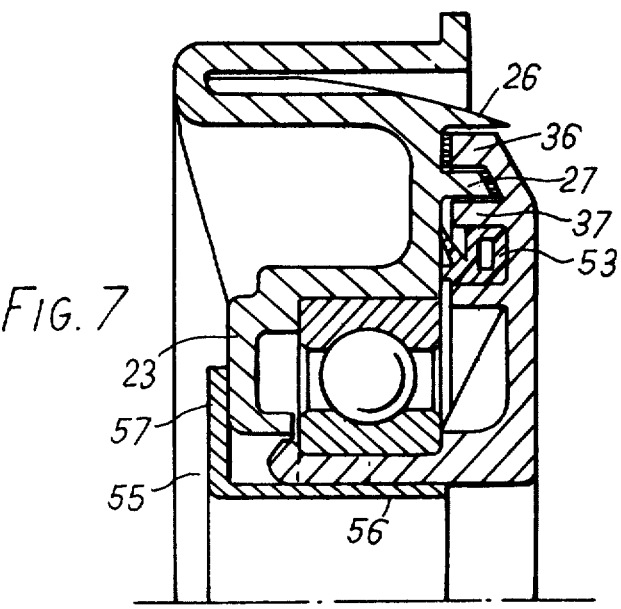

BEARING ASSEMBLIES FOR CONVEYOR ROLLERS FITTED WITH END COVERS

This invention relates to conveyor rollers of the kind comprising a roller tube fitted with end cap assemblies incorporating bearings for rotatably mounting the roller tube on a fixed shaft.

The environment in which conveyor rollers operate can be very arduous in terms of dust, dirt, and water entering the bearings and causing them to fail by seizure. Hitherto, end cap bearing assemblies in conveyor rollers have generally been provided with seals interposed between the bearing and an end cover which is held adjacent the bearing inner ring by circlips on the shaft. In such constructions the tube length tolerance and the distance between the circlip grooves on the shaft are critical.

The object of the invention is to provide an end cap assembly for a conveyor roller which does not impose close manufacturing tolerances on other components of the conveyor unit.

According to the present invention there is provided an end cap assembly for mounting a roller tube of a roller conveyor on a fixed shaft, comprising an annular housing adapted to be mounted in an end of the roller tube, said housing having an end wall formed with at least one annular tongue and a central recess, a bearing comprising an outer bearing ring firmly secured in said recess in the end wall of the housing, an inner bearing ring, said bearing rings having grooved tracks, and rolling elements mounted in said grooved tracks so that the bearing is adapted to resist radial forces and axial forces in both directions, an annular end cover having a central bore for passage of the shaft therethrough, said end cover having at least one annular tongue and an annular flange which extends as a close fit through the inner bearing ring, the annular tongues on said housing and end cover being interleaved to form a narrow annular tortuous labyrinth passageway between the bearing and the exterior of the end cap assembly, abutments on said end cover which engage opposite sides of the inner bearing ring to secure the end cover axially with respect to the inner bearing ring, whereby the end cap assembly is a self-contained unit in which the rotary component consisting of the housing and outer bearing ring is located axially with respect to the stationary component consisting of the end cover and the inner bearing ring by engagement of the rolling elements in said grooved tracks so that the width of the labyrinth passageway between the two components remains substantially constant, and an annular seal of resilient material compressed axially between the two components and arranged to close the inner end of said labyrinth passageway.

Since the end cap assembly of the invention is a self-contained unit, a conveyor roller fitted with the end cap assemblies can be located on a shaft by circlips which permit axial freedom of movement of the roller.

In a preferred construction of the end cap assembly of the invention, the housing and the end cover are moulded in polymeric material, preferably resilient plastics material, the annular flange on the end cover has a step which abuts the face of the inner bearing ring adjacent the root portion of the flange, and the free end of the annular flange is split longitudinally to form a plurality of resilient fingers, the free ends of the fingers having enlarged ends which engage against the side of the inner bearing ring remote from the root portion of the flange. The bearing can conveniently be a ball bearing.

The construction of the end cap assembly as a self-contained unit provides other important advantages in assembly and sealing of the units, and in operation and maintenance of conveyor rollers fitted with the units.

The end cap assembly can be assembled in a clean and controlled environment to minimise risk of contamination of the bearing or lubricant during assembly. The end cap assembly is preferably provided with a detachable annular shield made of plastics or cardboard and adapted to prevent contamination of the unit during handling or storage prior to its assembly in a roller tube. Such a shield can conveniently comprise a cylindrical tube engaged as a sliding fit in the bore of the end cover and an annular flange on the end of the tube engaged flat against the side of the housing remote from the end cover.

The annular labyrinth passageway provides a seal between the housing and the end cover, and since the housing and end cover are held in fixed axial relationship to one another by the bearing, the axial width of the passageway within the labyrinth seal is maintained within a small tolerance limited only by the axial internal clearance of the bearing.

The annular seal is preferably positioned radially inwards relative to the labyrinth seal and compressed between the housing and the end cover so as to seal the radially inner end of the passageway in the labyrinth seal. The rubbing friction exerted by the annular seal will remain substantially constant since the distance between the housing and the end cover, and hence the compression of the seal, remains constant.

This seal arrangement in which as annular rubbing seal is positioned inside a labyrinth seal makes the maximum use of the space between the inner and outer peripheries of the end cap assembly. In conveyor rollers fitted with end cap assemblies with this seal arrangement, the reduction in the axial space occupied by the sealing means, compared to that of the prior known conveyor rollers, enables each bearing to be positioned closer to the point on which the shaft is supported on the frame or bracket, and this has the effect of increasing the calculated life of the bearing. Moreover the diameter of the shaft can be reduced when the bearing is positioned closer to the point on which the shaft in supported.

The end cap assembly of the invention has the further advantage that, since the annular flange on the end cover extends through the inner bearing ring, a smaller diameter shaft will be required to support a roller fitted with the end cap assembly, than would be the case with the prior known end cap assemblies in which the inner bearing rings are mounted directly on the shaft. Furthermore, shafting with a larger diameter tolerance can be employed, for example bright drawn material instead of ground stock. A cost saving can therefore be realised by using shafting of smaller diameter and larger manufacturing tolerance.

An O-ring of rubber or like resilient material may be located in an annular groove in the bore of the end cover so that, when the bearing assembly is mounted on a shaft in a conveyor roller, the O-ring will provide a seal between the end cover and the shaft.

As explained above, a conveyor roller fitted with end cap assemblies according to the invention may be located axially on a shaft by circlips. The use of circlips can however be avoided by providing the end cover of each end cap assembly with a lip or tongue engageable as a snap fit in a groove in the shaft. This construction has the advantages that there are less components required for assembly, the bearing assembly can be positioned nearer to the shaft support, and the end cover can have a smooth face to abut the frame of the conveyor. In addition, the lip or tongue can be arranged to engage the base of the groove in the shaft so as to act as a seal preventing ingress of foreign matter between the end cover of the assembly and the shaft.

End cap assemblies according to the invention may be provided with different seal arrangements for use in different operating conditions. Rollers in a conveyor unit can have different sealing requirements to combat moisture, dust and friction torque. Each of these conditions can be catered for by use of an end cap assembly having a seal pack with particular sealing characteristics. For this purpose, the end cover of each end cap assembly can conveniently be provided with signal means or a particular colour representative of the characteristics of its seal. Alternatively, the housing of an end cap assembly may be provided with a plurality of end covers each adapted to be fitted to the housing to form an end cap assembly according to the invention, each end cover being fitted with a different annular seal having different characteristics particularly suitable for use in different operating conditions, and each end cover having indicia denoting the particular characteristics of its seal.

Figure 4:
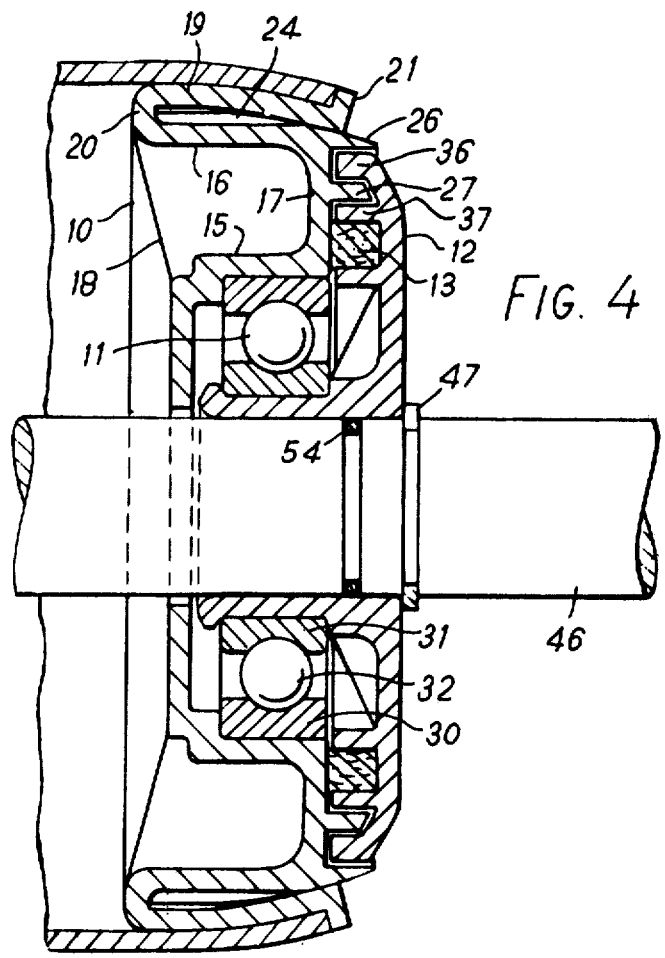

Embodiments of the invention will now be described, by way of example, with reference to the accompanying drawings, in which:

FIG. 1 is an end view of an end cap assembly for a conveyor roller, taken in the direction of arrow A in FIG. 2, FIG. 2 is a cross sectional side elevation of the end cap assembly of FIG. 1, FIG. 3 is an end view of the end cap assembly taken in the direction of arrow B in FIG. 2, FIG. 4 is a cross sectional side elevation of one end of a conveyor roller incorporating the end cap assembly of FIGS. 1–3, FIG. 5 is a cross sectional side elevation of the upper half of one end of a conveyor roller incorporating a modified construction of end cap assembly, FIG. 6 is a view similar to FIG. 5 and showing another modified construction of end cap assembly, and FIG. 7 is a cross sectional view of the upper half of the end cap assembly of FIGS. 1–3 but fitted with a different construction of seal and a protective shield.

The end cap assembly shown in FIGS. 1–3 comprises a housing 10 fitted with a ball bearing 11, an end cover 12 engaged as a snap fit in the bore of the bearing, and an annular felt seal 13 compressed between the housing and the end cover.

The housing 10 is made of a resilient plastics material, preferably glassfibre reinforced nylon, and comprises a cylindrical inner wall 15, a cylindrical outer wall 16 surrounding the inner wall 15, an end wall 17 integral with adjacent ends of the walls 15, 16, and a plurality of radial webs 18 (FIG. 3) spaced around the housing and extending between the inner and outer walls 15, 16, the webs 18 being integral with the walls 15, 16, 17. A cylindrical sleeve 19 surrounds the wall 16 and is connected thereto at the end remote from end wall 17 by an annular bight portion 20 of U-shaped cross section, to form a spring support for the end cap assembly. The end of the sleeve 19 remote from the bight portion 20 is formed with a radial flange 21. The end of the cylindrical inner wall 15 remote from wall 17 is formed with an annular step 22 forming an abutment for the bearing 11, and a further end wall 23 integral with the step 22 extends radially inwards as shown in FIG. 2. The inner periphery of the end wall 23 is formed with an axially-extending annular flange 23' which terminates close to the inner ring of the bearing.

The outside surface of the outer wall 16 of the housing is formed with a plurality of axially extending ribs 24 spaced around the housing, each rib being radially aligned with one of the radial webs 18. The ends of the ribs 24 adjacent the bight portion 20 have radially outer surfaces 25 which are flat and parallel and spaced close to the inside surface of the sleeve 19, and the remainder of the radially outer surfaces 25 of the ribs are curved radially inwards in the axial direction away from the bight portion 20. The end wall 17 is formed with two concentric annular tongues 26, 27 on the side remote from the webs 18, the radially outer tongue 26 having a curved outer surface which forms an extension of the curved outer surfaces 25 of the ribs 24.

The ball bearing 11 comprises an outer bearing ring 30, an inner bearing ring 31 and balls 32 in rolling engagement with grooved tracks on the rings 30, 31 so that the bearing is capable of resisting radial forces and axial forces in both directions. The outer ring 30 is a tight fit against the inside surface of the cylindrical wall 15 and abuts against the step 22.

The end cover 12 is also made of resilient plastics material, preferably unfilled nylon, and comprises an annular disc 35 formed on one side with three concentric annular tongues 36, 37, 38 and a cylindrical flange 39 at the centre of the disc 35. The free end of flange 39 is split axially and formed into four resilient fingers 40 having enlarged ends 41 which extend through the bore of the inner bearing ring 31 and engage as a snap fit on the chamfer thereof, and the centre portion of the flange 39 is formed with an annular step 42 which abuts against the adjacent face of the inner bearing ring when the enlarged ends on the fingers engage the opposite side of the inner bearing ring, thereby axially locating the end cover relative to the bearing and the housing 10. The radially outer tongue 36 on the cover projects between the tongues 26, 27 on the housing, and the tongue 37 on the cover is spaced close to the tongue 27 on the housing, so as to provide a narrow tortuous gap between the tongues 37, 27, 36, 26 forming a labyrinth seal between the housing and the cover.

The annular felt seal 13 is mounted as a close fit in the annular recess formed between the tongues 37, 38 on the cover, and has an axial width such that it is compressed between the cover and the housing so as to be in rubbing contact with the end wall 17 of the housing upon rotation of the housing relative to the cover. The seal 13 thus closes off the radially inner end of the narrow gap of the labyrinth seal. The annular recess 45 between the tongue 38 and the cylindrical flange 39 on the cover is filled with grease for lubricating the bearing, the seal 13 preventing escape of the grease through the labyrinth.

The end cap assembly is designed for use with a cylindrical steel roller tube having an internal diameter such that the sleeve 19 of the end cap assembly is a hand push-fit within the roller tube, the roller tube having an external diameter which is not smaller than that of the flange 21. The end cap assembly is secured in position in the end of the roller tube, with the flange 21 abutting the end of the tube by swaging the end of the roller tube radially inwards, that is reducing the diameter of the end of the roller tube by external pressure, so as to force the sleeve 19 against the ribs 24 on the housing as shown in FIG. 4. The walls 15, 16, 17 and the radial webs 18 form a substantially rigid frame which resists deformation under the swaging pressure applied to the roller tube. The swaging operation is preferably controlled by a pressure transducer designed to prevent the swaging pressure exceeding a predetermined maximum value.

The end cap assembly, fitted in the roller tube, is mounted on a shaft 46 (FIG. 4) fixed in the frame of a conveyor, the shaft 46 being a close sliding fit in the bore of the cylindrical flange 39 on the cover. The end cap assembly is axially located by a circlip 47 engaged in a groove in the shaft as shown in FIG. 4. A rubber O ring 54 is located in a groove in the shaft and provides a seal between the shaft and the bore of the end cover. The O ring 54 may if desired be mounted in a groove in the bore of the end cover.

In a modified construction of the end cap assembly shown in FIG. 5 the end of the bore in the cover remote from the fingers 40 is formed with a diameter slightly less than that of the shaft 46 and the remainder of the bore to form a lip 48. When the end cap assembly is being mounted on the shaft 46, the lip 48 is deflected radially outwards by engagement with the shaft until the lip is brought into register with an annular groove in the shaft. The lip then snaps into the groove and locates the end cap assembly axially on the shaft.

FIG. 6 shows a further modified construction of the end cap assembly in which the end of the bore in the cover remote from the fingers 40 is formed with a resilient annular tongue 49 which projects into the bore but is movable radially outwards against its own resilience into an annular recess in the cover. The tongue 49 is adapted to snap into a groove in the shaft to locate the end cap assembly axially on the shaft, in the same way as that of the lip 48 in FIG. 5. The tongue 49 of FIG. 6 has however the additional advantage that it engages the bottom of the groove in the shaft and acts as a seal between the cover and the shaft.

The felt seal ring 13 shown in FIGS. 1 and 4 may be replaced by a seal consisting of an axially narrower ring 50 of felt and a further ring 51 of resilient material, for example foam plastics, compressed between the cover and the ring 50 so as to exert a force on the ring 50 urging it into rubbing contact with the end wall 17 of the housing. The rings 50, 51 may be bonded to one another. Alternatively, the seal 13 may be replaced by lip seals of polyurethane or other suitable material as shown at 52 and 53 in FIGS. 6 and 7 respectively. In addition, the annular tongues 27, 36 on the housing and cover respectively may be provided with fibreflock to increase the resistance to passage of dust/fluid through the labyrinth seal.

The end cover 12 of the end cap assembly is preferably provided with indicia representative of the operational characteristics of the annular seal mounted in the recess between the tongues 37, 38. For example, the end covers of end cap assemblies fitted with seals suitable for use on waterlogged sites, in dusty conditions or in a slurry respectively may each be of a different colour, so that an operator can select the end cap assembly suitable for any given operating conditions without dismantling the end cap assembly to identify the seal. Alternatively, a plurality of end covers each fitted with a different seal identified by indicia on the cover may be provided for use selectively with a housing 10 fitted with a ball bearing.

As shown in FIG. 7, the end cap assembly is preferably provided with a detachable annular shield 55 to prevent contamination of the bearing during handling or storage prior to being assembled into a tube. The shield, which can conveniently be made of cardboard or plastics, comprises a cylindrical tube 56 adapted to be a close sliding fit in the bore of the end cover, and an annular flange 57 on one end of the tube 56 adapted to engage flat against the end wall 23 on the housing when the tube 56 is engaged in the bore of the cover.

We claim:

1. An end cap assembly for mounting a roller tube of a roller conveyor on a fixed shaft, comprising an annular housing adapted to be mounted in an end of the roller tube, said housing having an end wall formed with at least one annular tongue and a central recess, a bearing comprising an outer bearing ring firmly secured in said recess in the end wall of the housing, an inner bearing ring, said bearing rings having grooved tracks, and rolling elements mounted in said grooved tracks so that the bearing is adapted to resist radial forces and axial forces in both directions, an annular end cover having a central bore for passage of the shaft therethrough, said end cover having at least one annular tongue and an annular flange which extends as a close fit through the inner bearing ring, the annular tongues on said housing and end cover being interleaved to form a narrow annular tortuous labyrinth passageway between the bearing and the exterior of the end cap assembly, abutments on said end cover which engage opposite sides of the inner bearing ring to secure the end cover axially with respect to the inner bearing ring, whereby the end cap assembly is a self-contained unit in which the rotary component consisting of the housing and outer bearing ring is located axially with respect to the stationary component consisting of the end cover and the inner bearing ring by engagement of the rolling elements in said grooved tracks so that the width of the labyrinth passageway between the two components remains substantially constant, and an annular seal of resilient material compressed axially between the two components and arranged to close the inner end of said labyrinth passageway.

2. An end cap assembly as claimed in claim 1, in which one of said components is formed with an annular channel inset radially inwards relative to said annular tongues and the other of said components has a flat radial surface facing said channel, the annular seal being mounted in said channel and in sliding engagement with said flat radial surface.

3. An end cap assembly as claimed in claim 2, wherein the annular seal comprises two rings arranged side by side in said annular channel, one ring being made of fibrous material and being in sliding engagement with said flat radial surface on said other component and the other ring being made of elastic material and being located in the base of said annular channel.

4. An end cap assembly as claimed in claim 3, wherein the two rings are bonded to one another.

5. An end cap assembly as claimed in claim 1, and fitted on a shaft extending through the bore in the end cover, the surface of said shaft having an annular groove, wherein the end cover is made of plastics material and is formed with an annular tongue which projects inside the bore in the end cover but is retractable out of the bore against its own resilience, the tongue projecting into said annular groove and engaging the base of the groove so as to locate the end cap assembly on the shaft and provide a seal between the end cover and the shaft.

6. An end cap assembly as claimed in claim 1, wherein at least one of said tongues is lined with fibre flock.

7. An end cap assembly as claimed in claim 1, wherein the end cover is made of plastics material and an end of the bore in the end cover is formed with a lip having a diameter slightly less than that of the remainder of the bore, whereby said lip is engageable as a snap fit in a groove in a shaft engaged as a close sliding fit in said bore so as to locate the end cap assembly axially on the shaft.

8. An end cap assembly as claimed in claim 1, and fitted with a detachable annular shield to prevent contamination of the end cap assembly prior to being fitted in a roller tube, said shield comprising a cylindrical tube engaged as a sliding fit in the bore in the end cover, and an annular flange on the end of the tube engaged flat against the side of the housing remote from the end cover.

9. An end cap assembly for mounting a roller tube of a roller conveyor on a fixed shaft, comprising an annular housing of plastics material adapted to be mounted in an end of the roller tube, said housing having an end wall formed with annular tongues and a central recess, a bearing comprising an outer bearing ring firmly secured in said recess in the end wall of the housing, an inner bearing ring, said bearing rings having grooved tracks, and rolling elements mounted in said grooved tracks so that the bearing can resist radial forces and axial forces in both directions, an annular end cover of plastics material having a central bore for passage of the shaft therethrough, said end cover having an annular flange which extends as a close fit through the inner bearing ring, said end cover having annular tongues interleaved with said annular tongues on the housing to form a narrow annular tortuous labyrinth passageway between the bearing and the exterior of the end cap assembly, and said end cover having an annular channel inset radially inwards relative to said annular tongues, the free end of said annular flange being split longitudinally to form a plurality of resilient fingers, the free ends of the fingers having enlarged ends which engage against the side of the inner bearing ring remote from the root portion of the flange, and the end cover having an abutment engaging the other side of the inner bearing ring adjacent the root portion of the flange, whereby the end cap assembly is a self-contained unit in which the rotary component consisting of the housing and outer bearing ring is located axially with respect to the stationary component consisting of the end cover and the inner bearing ring by engagement of the rolling elements in said grooved tracks so that the width of the labyrinth passageway between the two components remains substantially constant, and an annular seal of resilient material mounted in said annular channel on the end cover and compressed axially between the two components so as to close the inner end of said labyrinth passageway.

* * * * *